(12) United States Patent
Heinz et al.

(10) Patent No.: US 11,256,052 B2
(45) Date of Patent: Feb. 22, 2022

(54) FLAME RETARDANT FIBER OPTIC CABLE WITH HALOGEN FREE SHEATH FOR BLOWING APPLICATIONS

(71) Applicant: Corning Research & Development Corporation, Corning, NY (US)

(72) Inventors: Michael Alexander Heinz, Berlin (DE); Ravinder Kumar Kinnera, Berlin (DE)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 16/919,418

(22) Filed: Jul. 2, 2020

(65) Prior Publication Data
US 2021/0011238 A1    Jan. 14, 2021

Related U.S. Application Data

(60) Provisional application No. 62/871,805, filed on Jul. 9, 2019.

(51) Int. Cl.
*G02B 6/44* (2006.01)
(52) U.S. Cl.
CPC ......... *G02B 6/4436* (2013.01); *G02B 6/4432* (2013.01)
(58) Field of Classification Search
CPC .................................................. G02B 6/4436
See application file for complete search history.

(56) References Cited

U.S. PATENT DOCUMENTS 6,801,695 B2   10/2004   Lanier et al.
9,658,418 B2    5/2017   Ceschiat et al.
(Continued)

FOREIGN PATENT DOCUMENTS

CN       202421588 U    9/2012
EP       0829742 A1     3/1998
(Continued)

OTHER PUBLICATIONS

Anonymous: "CEN-EN 13501-6—Fire classification of construction products and building elements—Part 6: Classification using data from reaction to fire tests on power, control and communication cables : Engineering360",Oct. 29, 2020 (Oct. 29, 2020).
(Continued)

*Primary Examiner* — Charlie Y Peng
(74) *Attorney, Agent, or Firm* — William D. Doyle

(57) ABSTRACT

Embodiments of the disclosure relate to an optical fiber cable. The optical fiber cable includes a subunit having a first interior surface and a first exterior surface. The first interior surface defines a central bore along a longitudinal axis of the optical fiber cable. At least one optical fiber is disposed within the central bore of the subunit, and a plurality of strengthening yarns is disposed around the subunit. A cable sheath disposed around the plurality of strengthening yarns. The cable sheath has a second interior surface and a second exterior surface. The second exterior surface defines an outermost surface of the optical fiber cable. The cable sheath includes from 55% to 68% by weight of a mineral-based flame retardant additive and from 35% to 45% by weight of a polymer blend. The polymer blend includes a co-polyester or co-polyether and a polyolefin or a polyolefin elastomer.

17 Claims, 2 Drawing Sheets

(56) References Cited

U.S. PATENT DOCUMENTS

| | | | |
|---|---|---|---|
| 9,784,935 B2 | 10/2017 | Bringuier et al. | |
| 10,388,429 B1* | 8/2019 | McNutt | G02B 6/4416 |
| 10,669,412 B2* | 6/2020 | Delineau | H01B 3/441 |
| 11,031,152 B2* | 6/2021 | Galletti | C08K 3/016 |
| 2002/0001715 A1* | 1/2002 | Redondo | H01B 3/441 |
| | | | 428/375 |
| 2003/0095762 A1* | 5/2003 | Brown | G02B 6/4485 |
| | | | 385/100 |
| 2004/0156609 A1 | 8/2004 | Lanier et al. | |
| 2009/0087153 A1 | 4/2009 | Weiss et al. | |
| 2015/0277074 A1* | 10/2015 | Villiger | G02B 6/4438 |
| | | | 385/113 |
| 2018/0134883 A1 | 5/2018 | Bringuier et al. | |
| 2019/0154934 A1 | 5/2019 | Cheng et al. | |
| 2020/0386964 A1 | 12/2020 | Cheng et al. | |

FOREIGN PATENT DOCUMENTS

| | | | |
|---|---|---|---|
| EP | 1006385 A1 | 6/2000 | |
| EP | 3270201 A1 | 1/2018 | |
| WO | 2019/027880 A1 | 2/2019 | |
| WO | WO-2020145738 A1 * | 7/2020 | ............ C09K 21/02 |

OTHER PUBLICATIONS

Darwyler, "FO Indoor FTTH / I-M(ZN)H", Available Online at <https://www.itinfra.datwyler.com/en/products/data-centres/fibre-optic-technology/indoor-cables/product/fo-indoor-ftth--mznh-2.html?cHash=94c8902a924499bcb74fd92002748092&cy=GBR>, Retrieved in 2020, 3 pages.

Extended European Search Report and Search Opinion; 20183542.8; dated Nov. 10, 2020; 11 pages; European Patent Office.

* cited by examiner

FLAME RETARDANT FIBER OPTIC CABLE WITH HALOGEN FREE SHEATH FOR BLOWING APPLICATIONS

CROSS-REFERENCED TO RELATED APPLICATIONS

This application claims the benefit of priority under 35 U.S.C. § 119 of U.S. Provisional Application Ser. No. 62/871,805 filed on Jul. 9, 2019, the content of which is relied upon and incorporated herein by reference in its entirety.

BACKGROUND

The disclosure relates generally to a fiber optic cable and more particularly to a flame retardant fiber optic cable configured for blowing through a duct of a building. Certain current standards require a degree of flame retardancy for construction products, especially for indoor applications. Some of these standards extend to electrical and telecommunication cables. Often, to achieve the requisite degree of flame retardance for these cables, desired mechanical properties may have to be compromised for the cable construction. Besides reliability over its life, the compromised mechanical properties can also make installation of the optical fiber cable more difficult.

SUMMARY

In one aspect, the present disclosure relates to an optical fiber cable. The optical fiber cable includes a subunit having a first interior surface and a first exterior surface. The first interior surface defines a central bore along a longitudinal axis of the optical fiber cable. At least one optical fiber is disposed within the central bore of the subunit, and a plurality of strengthening yarns is disposed around the subunit. A cable sheath disposed around the plurality of strengthening yarns. The cable sheath has a second interior surface and a second exterior surface. The second exterior surface defines an outermost surface of the optical fiber cable. The cable sheath includes from 55% to 68% by weight of a mineral-based flame retardant additive and from 35% to 45% by weight of a polymer blend. The polymer blend includes a co-polyester or co-polyether and a polyolefin or a polyolefin elastomer.

In another aspect, the present disclosure relates to an indoor optical fiber cable. The indoor optical fiber cable includes at least one subunit. Each subunit includes a first interior surface and a first exterior surface. The first interior surface of each subunit defines a central bore along a longitudinal axis of the indoor optical fiber cable. At least one optical fiber is disposed within the central bore of each subunit, and at least one strengthening yarn is wrapped around the at least one subunit. A cable sheath is disposed around the at least one strengthening yarn. The cable sheath has a second interior surface and a second exterior surface. The second exterior surface defines an outermost surface of the indoor optical fiber cable. The cable sheath comprises a low smoke, zero halogen (LSZH) material having a limiting oxygen index of at least 40% as measured according to ASTM D 2863 A. The LSZH material has a density of at least 1.6 g/cm$^3$.

In still another aspect, the present disclosure relate to an optical fiber cable. The optical fiber cable includes a subunit having a first interior surface and a first exterior surface. The first interior surface of the subunit defines a central bore along a longitudinal axis of the optical fiber cable. At least one optical fiber is disposed within the central bore of the subunit, and a yarn layer disposed around the subunit. A cable sheath is disposed around the yarn layer. The cable sheath has a second interior surface and a second exterior surface. The second exterior surface defines an outermost surface of the optical fiber cable and an outer diameter of the optical fiber cable. The outer diameter is 3 mm or less. The optical fiber cable is configured to be blown a distance of at least 150 m through a duct having an inner diameter of 3.5 mm to 4 mm, and the optical fiber cable achieves a $B2_{ca}$-s1, a1, d0 rating according to EN13501-6.

Additional features and advantages will be set forth in the detailed description that follows, and in part will be readily apparent to those skilled in the art from the description or recognized by practicing the embodiments as described in the written description and claims hereof, as well as the appended drawing.

It is to be understood that both the foregoing general description and the following detailed description are merely exemplary, and are intended to provide an overview or framework to understand the nature and character of the claims.

BRIEF DESCRIPTION OF THE DRAWING

The accompanying drawing is included to provide a further understanding and are incorporated in and constitute a part of this specification. The drawing illustrates one or more embodiment(s), and together with the description serves to explain principles and the operation of the various embodiments.

DETAILED DESCRIPTION

Various embodiments of an optical fiber cable are provided that is configured to achieve a $B2_{ca}$-s1a, a1, d0 rating described in EN 13501-6. The optical fiber cable achieves the flame retardance rating through use of a cable sheath comprising a highly-filled, flame retardant composition and, in embodiments, a bedding layer having a composition with an even greater amount of flame retardant filling than the cable sheath. In certain embodiments, the cable includes a single subunit that is capable of carrying up to twelve optical fibers while still being able to be blown through a 3.5 mm or 4 mm duct within a building. The optical fiber cable is able to be blown through such ducts because the diameter of the optical fiber cable is kept to 3 mm or less and because the material from which the cable sheath is made has a low coefficient of friction. Space is conserved in the cable construction to keep the diameter at or below 3 mm by excluding rigid strength elements, such as glass reinforced plastic rods. Such rigid strength elements can be excluded because the material from which the cable sheath is made allows the cable to pass relevant temperature cycling tests without the need for rigid strength elements. Accordingly, in view of the flame retardancy and the ability of the optical fiber cable to be blown through such a narrow duct, the optical fiber cable disclosed herein is particularly suitable for use in indoor applications. In other embodiments, the optical fiber cable includes a plurality of subunits configured to carry, e.g., hundreds of optical fibers, and in such embodiments, the individual subunits contain strengthening yarns disposed therein to facilitate connnectorization of the subunits. These and other aspects and advantages will be discussed in relation to the exemplary embodiments disclosed herein. These embodiments of the optical fiber cable disclosed herein are provided by way of example and not by way of limitation.

Figure 1:
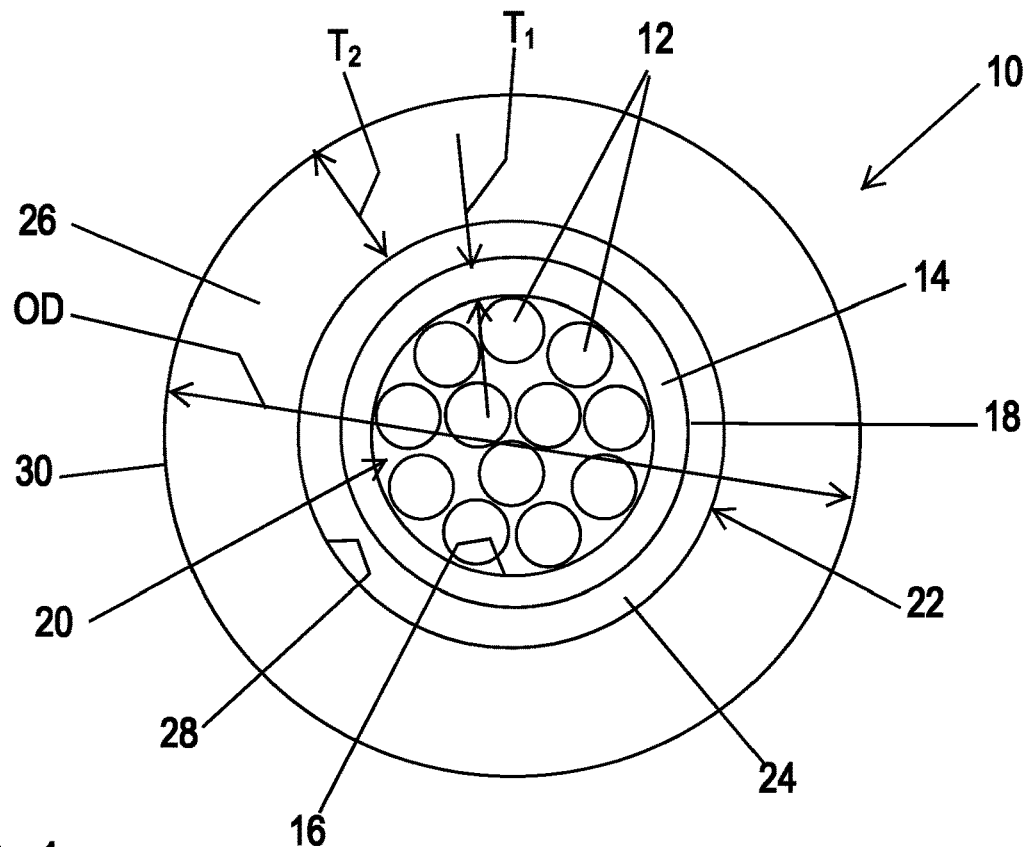
FIG. 1 depicts an embodiment of a flame retardant optical fiber cable, according to an exemplary embodiment.

FIG. 1 depicts an embodiment of an optical fiber cable 10, particularly for indoor use, that includes a plurality of optical fibers 12 disposed within a subunit 14. The subunit 14 includes a first interior surface 16 and a first exterior surface 18. The first interior surface 16 defines a central bore 20 in which the optical fibers 12 are disposed. In the embodiment shown in the FIG. 1, the optical fibers 12 are arranged within the bore 20 in a loose tube configuration (albeit with a relatively low amount of free space with in the subunit 14 as compared to other embodiments discussed below). In embodiments, the optical fibers 12 are bare or coated fibers, i.e., they include a core, a cladding surrounding the core, and a coating (optionally including a color-coded ink/pigment layer for identification). In embodiments, the number of optical fibers 12 in the subunit is from one to twelve optical fibers. In particular embodiments, the number of optical fibers 12 in the subunit is four, six, eight, or twelve optical fibers 12. In embodiments, the optical fiber cable 10 does not include any water-blocking gels within the bore 20, particularly if the optical fiber cable 10 is used for indoor applications.

The subunit 14 has a first thickness $T_1$ between the first interior surface 16 and the first exterior surface 18. In embodiments, the first thickness $T_1$ is from 0.05 to 0.5 mm, particularly about 0.1 mm for the embodiment shown in FIG. 1. In embodiments, the subunit 14 is comprised of a flame retardant compound comprising a mixture of thermoplastic elastomers based on polyolefins (e.g., polyethylene (PE), polypropylene (PP), polybutene, ethylene propylene diene monomer (EPDM) rubber, ethylene propylene rubber (EPR), ethylene vinyl acetate (EVA), ethylene butyl acrylate copolymer (EBA), ethylene methacrylate (EMA)) filled with one or more mineral-based flame retardants (e.g., aluminum trihydrate (ATH), magnesium hydroxide (MDH), or calcium carbonate ($CaCO_3$)). In embodiments, the compound is a blend of PP and a polyolefin or a rubber that is filled with a mixture of MDH and $CaCO_3$. Advantageously, because of the relatively low first thickness $T_1$ of the subunit 14, the optical fibers 12 can be used as ripcords to tear open the subunit 14 during installation. That is, the subunit 14 can be torn by pulling the optical fibers 12 against the wall of the subunit 14.

Disposed around the subunit 14 is a yarn layer 22 comprising a plurality of strengthening yarns 24. In embodiments, the strengthening yarns 24 are wrapped, stranded, or braided around the subunit 14 so as to take tensile stresses off of the optical fibers 12, e.g., when the optical fiber cable 10 is pulled. In other embodiments, the strengthening yarns 24 run longitudinally along the length of the subunit 14. In embodiments, the yarn layer 22 is from 0.05 mm to 0.2 mm thick, particularly about 0.1 mm. The yarn layer 22 is in contact with the exterior surface 18 of the subunit 14. In embodiments, the strengthening yarns 24 comprise aramid fibers, glass fibers, basalt fibers, or a combination of two or more thereof.

In the embodiment depicted in FIG. 1, a cable sheath 26 is disposed around the yarn layer 22. In embodiments, the cable sheath 26 forms a continuous and contiguous outer layer of the optical fiber cable 10 along the length of the optical fiber cable 10. The cable sheath 26 includes a second interior surface 28 and a second exterior surface 30 that define a second thickness $T_2$ therebetween. In embodiments, the second thickness $T_2$ is from 0.3 mm to 0.7 mm. Further, in embodiments, the second exterior surface 30 defines the outermost surface of the optical fiber cable 10. As such, the second exterior surface 30 further defines an outer diameter OD of the optical fiber cable 10. In embodiments, the outer diameter OD of the optical fiber cable 10 is no more than 3 mm, particularly from 2.2 mm to 2.7 mm (depending on fiber count). For example, in embodiments, an optical fiber cable 10 carrying four optical fibers 12 has an outer diameter OD of from about 2.2 mm to about 2.4 mm, and in embodiments, an optical fiber cable 10 carrying twelve optical fibers 12 has an outer diameter OD of from about 2.6 mm to 2.7 mm.

The cable sheath 26 of the optical fiber cable 10 is made of a low-smoke, zero halogen (LSZH) material. In particular, the LSZH material comprises a thermoplastic polymer blend filled with mineral-based flame retardant additives. In an embodiment, the polymer blend of the LSZH material comprises from 35% to 45% by weight of a co-polyester or co-polyether and polyolefins or polyolefin-based elastomers. In such embodiments, the mineral-based flame retardant additives may comprise at least one of aluminum trihydrate (ATH) or magnesium hydroxide (MDH) in an amount of 55% to 68% by weight. Further, the LSZH material may also include other synergistic flame retardant additives such as glass formers or ceramifiers (e.g., zinc borate, zinc molybdate, zinc stannate, etc.), nano-clays (e.g., bentonite, sepiolite, etc.), or mineral fillers (e.g., boehmite, silica, magnesiumoxisulfate, etc.) in the amount of 1.5% to 8% by weight (in addition to 55% to 68% by weight of the mineral-based flame retardant additives). The LSZH material may also include a coupling system, such as a maleic acid anhydride-grafted polyolefin, a vinyl-silane, or an aminosilane, in an amount of 0.5% to 4% by weight. Further, the LSZH material may include thermal stabilizers, antioxidants, and or processing additives in the amount of 0.1% to 1.0% each.

In embodiments, the LSZH material of the cable sheath 26 exhibits certain mechanical and flame retardant properties. In particular embodiments, the LSZH has a tensile strength of 10 MPa or higher and an elongation at break of at least 180% (both as measured according to IEC 811-1-1). Further, in embodiments, the LSZH material has a Shore A hardness of 90 or lower (as measured according to ISO 7619-1). In embodiments, the LSZH material has a density of at least 1.6 $g/cm^3$. Still further, in embodiments, the storage modulus of the LSZH material in tensile mode at −40° C. is less than 3000 MPa and at −50° C. is less than 3500 MPa. In embodiments, the LSZH material has a brittleness temperature below −50° C. Additionally, in embodiments, the LSZH material exhibits a penetration of less than 2% in a hot pressure test for 6 hours at 80° C. (as measured according to IEC 60811-508). Advantageously, the optical fiber cable 10 can be cycled between −40° C. and 70° C. without creating substantial change in attenuation (<0.30 dB/km at 1550 nm) of the signal carried by the optical fibers 12 according to IEC 60794-1-2-F1. Accordingly, rigid strength elements, such as glass-reinforced plastic rods, are not required to prevent such attenuation associated with thermal strain, which means that the diameter of the optical fiber cable 10 can be reduced by excluding these elements.

With respect to the flame retardant properties, the LSZH material has a limiting oxygen index (LOI) of at least 40% (as measured according to ASTM D 2863 A). Further, in embodiments, a sample of the LSZH material having a length and width of 100 mm and a thickness of 3 mm when tested with 50 kW irradiation exhibits a peak heat release rate (PHRR) of 200 kW/m$^2$ or less, a total heat release (THR) of 65 MJ/m$^2$ or less, and a smoke production (SEA) of 150 m$^2$/kg or less when measured using a cone calorimeter according to ISO 5660-1.

Figure 2:
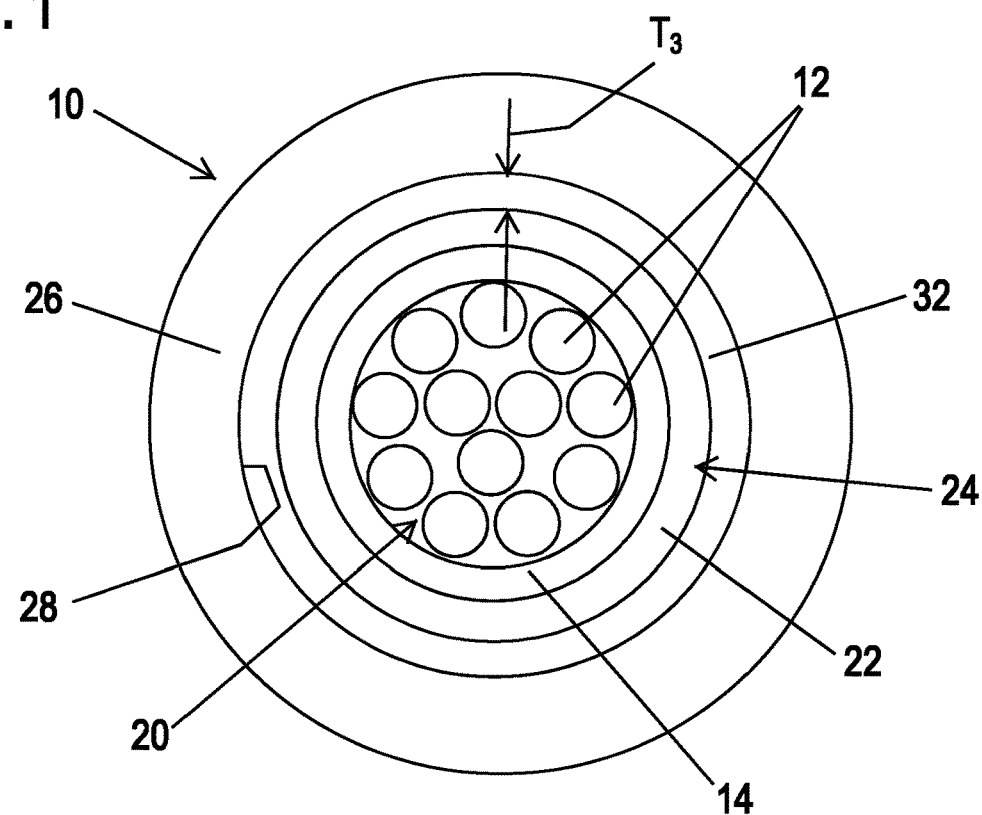
FIG. 2 depicts an embodiment of a flame retardant optical fiber cable having a bedding layer, according to an exemplary embodiment.

FIG. 2 depicts another embodiment of an optical fiber cable 10 including a bedding layer 32 disposed between the yarn layer 22 and the cable sheath 26. As shown in FIG. 2, the bedding layer 32 extends circumferentially around the yarn layer 22 and is in contact with the second interior surface 28 of the cable sheath 26. In embodiments, the bedding layer 32 has substantially the same thickness as the cable sheath 26. In embodiments, the bedding layer 32 has a third thickness $T_3$ of from 0.2 mm to 0.4 mm, and the combined thickness of the bedding layer 32 and the cable sheath 26 is thus from 0.3 mm to 0.7 mm. Further, in embodiments, the bedding layer 32 is substantially comprised of flame retardant fillers with a polymer binding. As such, the bedding layer 32 has a dough-like consistency and does not impart any substantial mechanical properties to the optical fiber cable. However, the bedding layer 32 improves flame retardant performance of the optical fiber cable 10 because some of the cable sheath 26 is replaced with the bedding layer 32, which has more flame retardant material than the cable sheath 26. Advantageously, in embodiments, the bedding layer 32 also reduces the cost to produce the optical fiber cable 10 because more of the relatively less expensive mineral-based flame retardant additive and less of the relatively more expensive cable sheath compound is used in the optical fiber cable 10.

In particular embodiments, the bedding layer 32 is comprised of 70% to 85% by weight of a mineral-based flame retardant additive, such as aluminum trihydrate or magnesium hydroxide. In embodiments, a portion of the mineral-based flame retardant additive may be substituted with calcium carbonate. The polymer binder of the bedding layer 32 is comprised of 10% to 30% by weight of a thermoplastic blend of polyolefin elastomers (e.g., EVA, EBA, EMA, EPR, EPDM rubber, and/or styrene-ethylene/butylene-styrene (SEBS)) or polyolefins (e.g., low density polyethylene (LDPE), linear low density polyethylene (LLDPE, and/or polypropylene (PP)). The bedding layer 32 may also comprise a coupling system, such as a maleic acid anhydride-grafted polyolefin, a vinyl-silane, or an aminosilane, in an amount of 0.5% to 4% by weight. Further, the bedding layer 32 may include thermal stabilizers, antioxidants, and or processing additives in the amount of 0.1% to 1.0% each. In embodiments, the bedding layer 32 has a density of 1.7 g/cm$^3$ or greater.

Advantageously, the embodiments of the optical fiber cables 10 described with respect to FIGS. 1 and 2 are capable of being routed through a duct having an inner diameter of 3.5 mm to 4 mm (or larger) as may typically be found running through a building interior. In particular, the optical fiber cables 10 are configured to carry up to twelve optical fibers 12 while still being able to be blown at least 150 m through a duct having an inner diameter as low as 3.5 mm. An optical fiber cable 10 constructed according to the foregoing description was blown through a track of duct that was arranged in a spiraling rectangular path having side lengths of 7 m and 3 m with corners having a radius of curvature of 10 mm×5 mm. One rectangular path length was equal to approximately 20 m. Accordingly, in traveling 150 m through the duct, the optical fiber cable 10 completed 32 turns. The ability to be blown through a duct having an inner diameter as low as 3.5 mm is provided in part by the small outer diameter of the optical fiber cable (3 mm or less) and in part by the low coefficient of friction of the LSZH material (from 0.21 to 0.24) used for the cable sheath.

Additionally, the construction of the optical fiber cable 10 according to the present disclosure provides other advantages with respect to cable installation. Typically, an optical fiber cable 10 may be routed (e.g., through a duct as described above) to a splice box where the individual optical fibers 12 can be spliced for distribution from the splice box. As mentioned, the cable sheath 26 allows for blowing of the optical fiber cable 10 through a duct to the splice box while providing flame retardancy along the substantial portion of the length. Once the optical fiber cable 10 reaches the splice box, the cable sheath 26 is able to be ring-cut, and at least a length of 1.5 m is able to be pulled off longitudinally over the yarn layer 22 and subunit 14. In this regard, the use of the above-described compounds for the subunit 14 helps prevent sticking between the cable sheath 26 and the subunit 14 such that the length of cable sheath 26 can be pulled over the subunit 14. Within the splice box, the subunit 14 protects the individual optical fibers 12 until they reach their splice location (e.g., inside a splice cassette).

Further, the embodiments of the optical fiber cables 10 described herein achieve a rating of B2$_{ca}$-s1a, a1, d0 described in EN 13501-6. In order to achieve rating B2$_{ca}$, the optical fiber cable 10 must pass the heat release and flame spread requirements of EN50399. Further, to achieve the rating s1a for smoke production, the optical fiber cable 10 must have a total smoke production of no more than 50 m$^2$ and a smoke product rate of no more than 0.25 m$^2$/s as measured according to EN50399 (which corresponds to the "s1" portion of the rating) and must pass the three-meter cube test according to EN 61034-2 with a minimum of 80% light transmission (which corresponds to the "a" portion of the rating). To achieve the rating a1 for acidity, the combusted gasses produced by the individual components of the optical fiber cable 10 during burn testing must have a conductivity of less than 2.5 µS/mm and a pH of greater than 4.3 according to EN50267-2-3. Finally, in order to achieve a flaming droplets rating of d0, the optical fiber cable 10 must exhibit no flaming droplets or particles as tested according to EN50399. Embodiments of the optical fiber cables 10 described herein were able to meet each of these requirements to achieve the rating of B2$_{ca}$-s1a, a1, d0.

Figure 3:
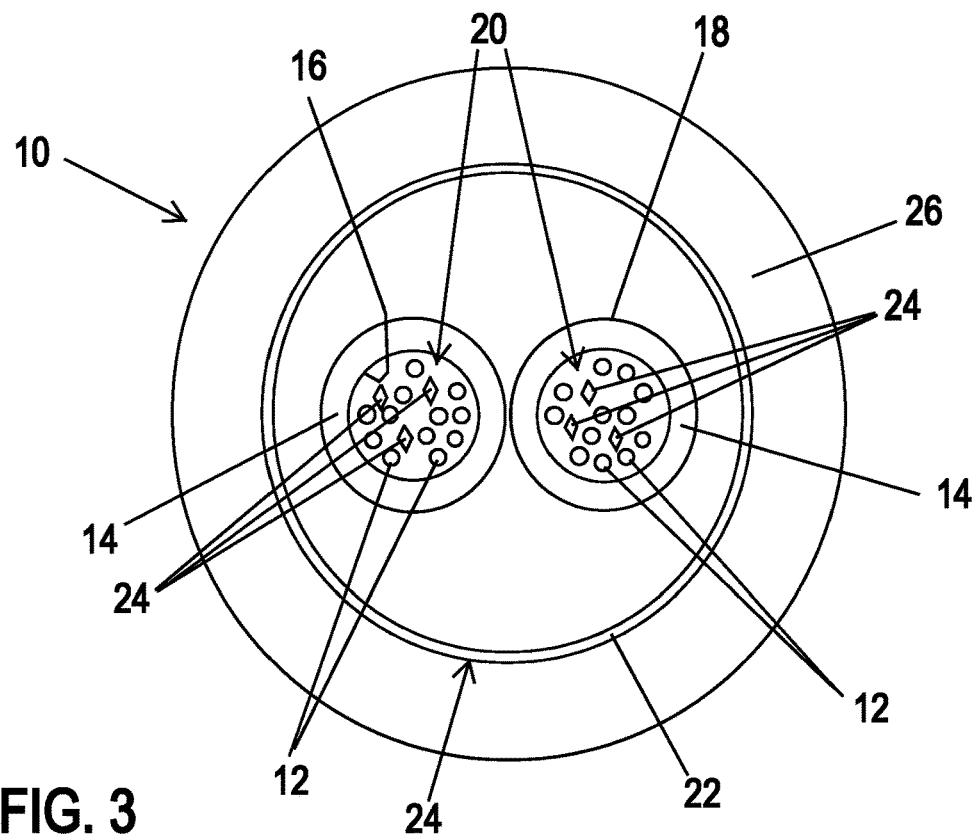
FIG. 3 depicts an embodiment of a flame retardant optical fiber cable having multiple subunits, according to an exemplary embodiment.
Figure 4:
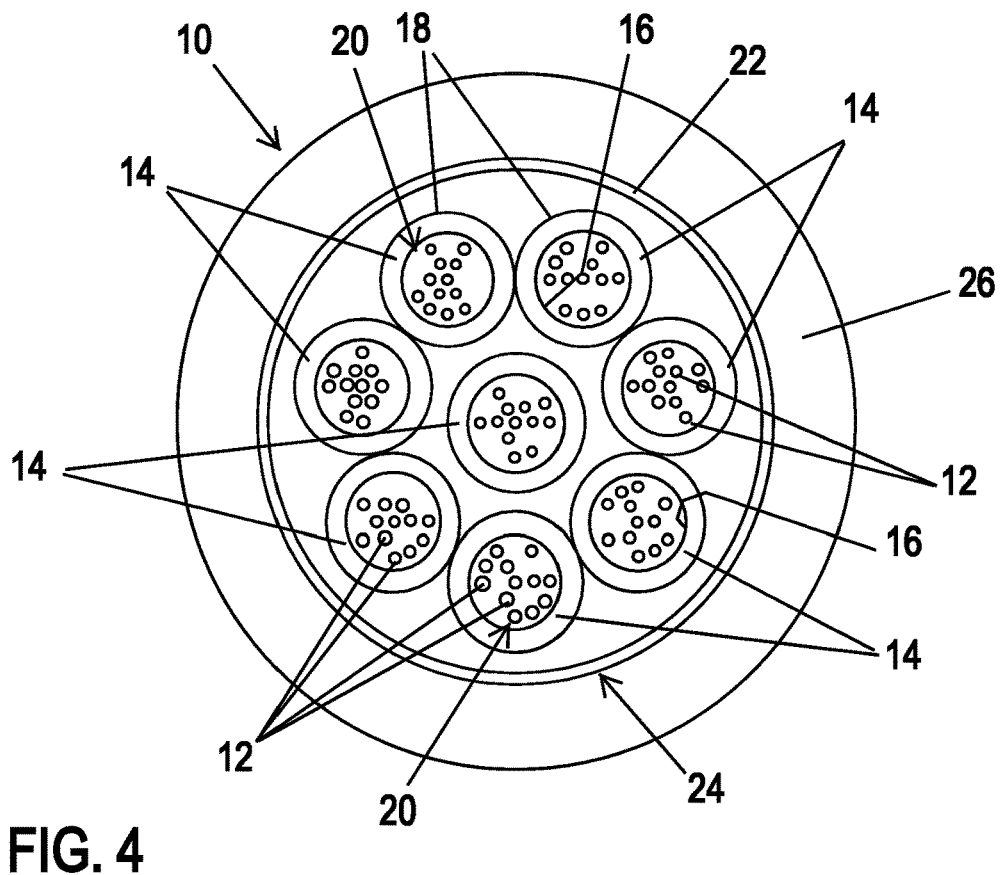
FIG. 4 depicts another embodiment of a flame retardant optical fiber cable having multiple subunits, according to an exemplary embodiment.

FIGS. 3 and 4 depict embodiments of optical fiber cables 10 including multiple subunits 14 that also are able to achieve a ration of B2$_{ca}$-s1a, a1, d0. Because these optical fiber cables 10 contain multiple subunits 14, the outer diameter OD of the optical fiber cables 10 is larger than the outer diameter OD of the optical fiber cables 10 of the embodiments of FIGS. 1 and 2. For example, the optical fiber cable 10 depicted in FIG. 3 includes two subunits 14 and has an outer diameter OD of 4 mm to 5 mm, and the optical fiber cable 10 of FIG. 4 includes eight subunits 14 and has an outer diameter of 6.5 mm to 8.5 mm. Other embodiments may include more than eight subunits 14 and the outer diameter may be correspondingly larger (e.g., up to 20 mm or more).

In embodiments, each of the subunits 14 of FIGS. 3 and 4 may contain from one to twelve optical fibers 12. Exemplary embodiments include, e.g., four, six, eight, or twelve optical fibers 12. As compared to the embodiments shown in FIGS. 1 and 2, the subunits 14 are larger and have a higher wall thickness. In this way, the optical fibers 12 have more free space within the subunits 14 of FIGS. 3 and 4. In particular, the subunits 14 of FIGS. 3 and 4 have an outer diameter of about 2 mm and a thickness of 0.05 to 0.5 mm. Additionally, in embodiments, the subunits 14 are made of a flame retardant compound including a mixture of thermoplastic elastomers based on polyolefins (such as PE, PP, polybutene, EPDM rubber, EPR, EVA, EBA, EMA) filled with mineral flame retardant (e.g., ATH, MDH, or $CaCO_3$). In embodiments, the compound is a blend of PP and a polyolefin or a rubber filled with a mixture of MDH and $CaCO_3$.

In embodiments, the subunits 14 contain and/or are surrounded by the strengthening yarns 24. In particular, a plurality of strengthening yarns 24 may be wrapped around the first exterior surfaces 18 of the subunits 14 to keep them bundled in the cable sheath 26. In embodiments, one to four strengthening yarns 24 are helically wrapped around the subunits 14 to keep them bundled. In such embodiments, the strengthening yarns 24 may not form a continuous layer (such as yarn layer 22 of FIGS. 1 and 2) around the subunits 14, and talcum powder may be applied to the first exterior surfaces 18 of the subunits 14 to prevent sticking to the cable sheath 26. In embodiments, the subunits 14 include strengthening yarns 24 within the central bore 20 to facilitate connectorizing the subunits 14 (as shown schematically in FIG. 3 with the diamonds representing strengthening yarns 24). During connectorizing, the strengthening yarns 24 are crimped into the connector to provide tensile strain relief for the optical fibers 12. The strengthening yarns 24 used on the interior and/or exterior of the subunit 14 may comprise aramid fibers, glass fibers, basalt fibers, or combinations of two or more thereof.

The plurality of subunits 14 are surrounded with the cable sheath 26 and, in embodiments, the bedding layer 32. The cable sheath 26 is made from the same LSZH material described above with respect to the embodiments of FIGS. 1 and 2. Further, in the embodiments in which it is provided, the bedding layer 32 is the same material as described above with respect to FIG. 2. In this way, optical fiber cables 10 having a higher fiber density are able to be provided with a high degree of flame retardance, particularly achieving the rating of $B2_{ca}$-s1a, a1, d0 described in EN 13501-6.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable, comprising:
   a subunit having a first interior surface and a first exterior surface, wherein the first interior surface defines a central bore along a longitudinal axis of the optical fiber cable;
   at least one optical fiber disposed within the central bore of the subunit;
   a plurality of strengthening yarns disposed around the subunit;
   a cable sheath disposed around the plurality of strengthening yarns, the cable sheath having a second interior surface and a second exterior surface, wherein the second exterior surface defines an outermost surface of the optical fiber cable, wherein the cable sheath comprises from 55% to 68% by weight of a mineral-based flame retardant additive and from 35% to 45% by weight of a polymer blend, and wherein the polymer blend comprises a co-polyester or co-polyether and a polyolefin or a polyolefin elastomer; and
   a bedding layer disposed between the second interior surface of the cable sheath and the plurality of strengthening yarns, wherein the bedding layer comprises a greater amount of mineral-based flame retardant additive than the cable sheath.

2. The optical fiber cable of claim 1, wherein optical fiber cable achieves a $B2_{ca}$-s1a, a1, d0 rating according to EN13501-6.

3. The optical fiber cable of claim 1, wherein the subunit has a thickness between the first interior surface and the first exterior surface of from 0.05 mm to 0.2 mm.

4. The optical fiber cable of claim 1, wherein the cable sheath has a density of greater than 1.6 $g/m^3$.

5. The optical fiber cable of claim 1, wherein the plurality of strengthening yarns comprises aramid fibers, glass fibers, basalt fibers, or combinations of two or more thereof.

6. The optical fiber cable of claim 1, wherein the second exterior surface of the cable sheath defines an outer diameter of the optical fiber cable and wherein the outer diameter is 3 mm or less.

7. The optical fiber cable of claim 6, wherein the optical fiber cable is configured to be blown a distance of at least 150 m through a duct having an inner diameter in a range of 3.5 mm to 4 mm.

8. The optical fiber cable of claim 1, wherein the mineral-based flame retardant additive comprises at least one of aluminum trihydrate or magnesium hydroxide.

9. The optical fiber cable of claim 1, wherein the bedding layer comprises from 10% to 30% by weight of a polyolefin or a polyolefin elastomer and from 70% to 85% by weight of the mineral-based flame retardant additive.

10. The optical fiber cable of claim 9, wherein the mineral-based flame retardant additive comprises at least one of aluminum trihydrate or magnesium hydroxide.

11. The optical fiber cable of claim 9, wherein the polyolefin or polyolefin elastomer comprises at least one of ethylene-vinyl acetate, ethylene butyl acrylate, ethylene methacrylate, ethylene propylene rubber, ethylene propylene diene monomer rubber, styrene-ethylene/butylene-styrene, low density polyethylene, linear low density polyethylene, or polypropylene.

12. The optical fiber cable of claim 1, wherein the cable sheath has a first thickness and the bedding layer has a second thickness and wherein the first thickness and the second thickness are substantially equal.

13. The optical fiber cable of claim 1, wherein the bedding layer has a density of at least 1.7 $g/cm^3$.

14. The optical fiber cable of claim 1, comprising at least one further subunit having a further central bore with at least one optical fiber disposed therein, wherein the plurality of strengthening yarns is disposed around the subunit and the at least one further subunit.

15. An indoor optical fiber cable, comprising:
- at least one subunit, each subunit comprising a first interior surface and a first exterior surface, wherein the first interior surface of each subunit defines a central bore along a longitudinal axis of the indoor optical fiber cable;
- at least one optical fiber disposed within the central bore of each subunit;
- at least one strengthening yarn wrapped around the at least one subunit;
- a cable sheath disposed around the at least one strengthening yarn, the cable sheath having a second interior surface and a second exterior surface, wherein the second exterior surface defines an outermost surface of the indoor optical fiber cable, wherein the cable sheath comprises a low smoke, zero halogen (LSZH) material having a limiting oxygen index of at least 40% as measured according to ASTM D 2863 A, wherein the LSZH material has a density of at least 1.6 g/cm$^3$; and wherein the cable sheath comprises from 55% to 68% by weight of a mineral-based flame retardant additive and from 35% to 45% by weight of a polymer blend; and wherein the polymer blend comprises a co-polyester or co-polyether and a polyolefin or a polyolefin elastomer; and
- a bedding layer disposed between the second interior surface of the cable sheath and the at least one strengthening yarn, wherein the bedding layer comprises from 10% to 30% by weight of a polyolefin or a polyolefin elastomer and from 70% to 85% by weight of the mineral-based flame retardant additive.

16. The indoor optical fiber cable of claim 15, wherein optical fiber cable achieves a $B2_{ca}$-s1a, a1, d0 rating according to EN13501-6.

17. The indoor optical fiber cable of claim 15, wherein each subunit has a thickness between the first interior surface and the first exterior surface of from 0.05 mm to 0.5 mm and wherein each subunit comprises a flame retardant compound comprising a thermoplastic elastomer and a mineral-based flame retardant.

* * * * *